(12) United States Patent
Redmann et al.

(10) Patent No.: US 9,160,965 B2
(45) Date of Patent: Oct. 13, 2015

(54) TELEPRESENCE COMMUNICATIONS SYSTEM AND METHOD

(75) Inventors: William Gibbens Redmann, Glendale, CA (US); Mark J. Huber, Burbank, CA (US); Mark Leroy Walker, Castaic, CA (US)

(73) Assignee: Thomson Licensing, Issy Les Moulineaux (FR)

( * ) Notice: Subject to any disclaimer, the term of this patent is extended or adjusted under 35 U.S.C. 154(b) by 77 days.

(21) Appl. No.: 14/131,528

(22) PCT Filed: Dec. 2, 2011

(86) PCT No.: PCT/US2011/063036
§ 371 (c)(1),
(2), (4) Date: Jan. 8, 2014

(87) PCT Pub. No.: WO2013/019259
PCT Pub. Date: Feb. 7, 2013

(65) Prior Publication Data
US 2014/0139620 A1    May 22, 2014

Related U.S. Application Data

(60) Provisional application No. 61/513,794, filed on Aug. 1, 2011.

(51) Int. Cl.
*H04N 7/14* (2006.01)
*H04N 7/15* (2006.01)
(Continued)

(52) U.S. Cl.
CPC .............. *H04N 7/141* (2013.01); *H04N 7/144* (2013.01); *H04N 7/15* (2013.01); *H04N 21/4223* (2013.01); *H04N 21/4402* (2013.01); *H04N 21/4788* (2013.01)

(58) Field of Classification Search
CPC ......... H04N 7/144; H04N 7/15; H04N 7/141; H04N 21/4402; H04N 21/4788; H04N 21/4223; H04N 7/14

USPC ............................................ 348/14.01–14.16
See application file for complete search history.

(56) References Cited

U.S. PATENT DOCUMENTS

| 5,548,324 A | 8/1996 | Downs et al. |
| 5,808,662 A | 9/1998 | Kinney et al. |

(Continued)

FOREIGN PATENT DOCUMENTS

| EP | 1126709 | 8/2001 |
| EP | 2202970 | 6/2010 |

(Continued)

OTHER PUBLICATIONS

Boronat et al., "Smooth Control of Adaptive Media Playout to Acquire IDMS in Cluster-based Applications," 36th Annual IEEE Conf. on Local Computer Networks, LCN 2011, Bonn, 2011 IEEE, pp. 613-621.

(Continued)

*Primary Examiner* — Melur Ramakrishnaiah
(74) *Attorney, Agent, or Firm* — Robert D. Shedd; Robert B. Levy (57) ABSTRACT

The sharing an image of a local participant in a group with at least one other participant in that group commences by establishing, for that local participant, orientation information indicative of an orientation of the communication channel local participant relative to a display screen and a video camera. The local participant sends his or her image of the local participant along with the orientation information to at least one other participant. The orientation information enables display of the image of the local participant with a common orientation recognized by the at least one other participant.

19 Claims, 10 Drawing Sheets

(51) Int. Cl.
*H04N 21/4223* (2011.01)
*H04N 21/4402* (2011.01)
*H04N 21/4788* (2011.01)

(56) References Cited

U.S. PATENT DOCUMENTS

| | | | |
|---|---|---|---|
| 6,653,545 | B2 | 11/2003 | Redmann et al. |
| 6,894,714 | B2 | 5/2005 | Gutta et al. |
| 7,236,615 | B2 | 6/2007 | Miller et al. |
| 7,318,051 | B2 | 1/2008 | Weston et al. |
| 7,518,051 | B2 | 4/2009 | Redmann |
| 7,528,860 | B2 | 5/2009 | Harville et al. |
| 7,669,219 | B2 | 2/2010 | Scott, III |
| 7,817,180 | B2 | 10/2010 | Jeong et al. |
| 7,849,145 | B2 | 12/2010 | Kang et al. |
| 7,873,983 | B2 | 1/2011 | Ducheneaut et al. |
| 7,921,156 | B1 | 4/2011 | Stolorz et al. |
| 8,060,525 | B2 | 11/2011 | Svendsen et al. |
| 8,126,268 | B2 | 2/2012 | Rossato et al. |
| 8,417,535 | B2 | 4/2013 | Kusumoto et al. |
| 8,527,334 | B2 | 9/2013 | Porter et al. |
| 8,606,634 | B2 | 12/2013 | Porter et al. |
| 2006/0136960 | A1 | 6/2006 | Morris |
| 2006/0174312 | A1 | 8/2006 | Ducheneaut et al. |
| 2006/0218577 | A1 | 9/2006 | Goodman et al. |
| 2006/0236352 | A1 | 10/2006 | Scott, III |
| 2006/0282856 | A1 | 12/2006 | Errico et al. |
| 2008/0249961 | A1 | 10/2008 | Harkness et al. |
| 2008/0266380 | A1* | 10/2008 | Gorzynski et al. ......... 348/14.08 |
| 2009/0033737 | A1 | 2/2009 | Goose et al. |
| 2009/0109278 | A1 | 4/2009 | Karnalkar et al. |
| 2009/0132356 | A1 | 5/2009 | Booth et al. |
| 2009/0169171 | A1 | 7/2009 | Massey et al. |
| 2009/0215538 | A1 | 8/2009 | Jew |
| 2009/0232285 | A1 | 9/2009 | Mani |
| 2009/0240771 | A1 | 9/2009 | Capobianco |
| 2009/0251599 | A1 | 10/2009 | Kashyap et al. |
| 2009/0293079 | A1 | 11/2009 | McKee et al. |
| 2009/0315974 | A1 | 12/2009 | Matthews |
| 2009/0328122 | A1 | 12/2009 | Amento et al. |
| 2010/0030648 | A1 | 2/2010 | Manolescu et al. |
| 2010/0066804 | A1 | 3/2010 | Shoemake et al. |
| 2010/0082727 | A1 | 4/2010 | Zalewski |
| 2010/0131385 | A1 | 5/2010 | Harrang et al. |
| 2010/0153577 | A1 | 6/2010 | Wohlert et al. |
| 2010/0171807 | A1 | 7/2010 | Tysso |
| 2010/0171848 | A1 | 7/2010 | Peters et al. |
| 2010/0223119 | A1 | 9/2010 | Klish |
| 2010/0302446 | A1 | 12/2010 | Mauchly et al. |
| 2010/0318405 | A1 | 12/2010 | Kirkby |
| 2011/0090302 | A1 | 4/2011 | Leviav et al. |
| 2011/0145881 | A1 | 6/2011 | Hartman et al. |
| 2011/0191288 | A1 | 8/2011 | Spears |
| 2011/0218656 | A1 | 9/2011 | Bishop et al. |
| 2011/0264532 | A1 | 10/2011 | Chan et al. |
| 2012/0026277 | A1 | 2/2012 | Malzbender et al. |
| 2012/0038742 | A1 | 2/2012 | Robinson et al. |
| 2012/0314077 | A1* | 12/2012 | Clavenna et al. ............. 348/159 |
| 2013/0282454 | A1 | 10/2013 | Alpert et al. |
| 2013/0303591 | A1 | 11/2013 | Brown et al. |

FOREIGN PATENT DOCUMENTS

| | | |
|---|---|---|
| JP | 09282133 | 10/1997 |
| KR | 812903 | 3/2008 |
| KR | 939904 | 2/2010 |
| KR | 2011125548 | 11/2011 |
| WO | WO2004032507 | 4/2004 |
| WO | WO2012008972 | 1/2012 |
| WO | WO2012162721 | 12/2012 |
| WO | WO2013019259 | 2/2013 |
| WO | WO2013103583 | 7/2013 |

OTHER PUBLICATIONS

Zarros et al., "Interparticipant Synchronization in Real-Time Multimedia Conferencing Using Feedback," IEEE/ACM Transactions on Networking, vol. 4, No. 2, Apr. 1996, New York, NY, USA, pp. 173-180.

Fan et al., "Learning to Predict Ad Clicks Based on Boosted Collaborative Filtering," IEEE Int'l. Conf. on Social Computing/IEEE Int'l. Conf. on Privacy, Security, Risk and Trust, 2010 IEEE, pp. 209-216.

Pan et al., "Real-Time Collaborative Video Watching on Mobile Devices with REST Services," 2012 Third FTRA Int'l. Conference on Mobile, Ubiquitous, and Intelligent Computing, 2012 IEEE, pp. 29-34.

Levent-Levi, "What Layouts Should a Dual Video System Support?VoIP Survivor," http://blog.radvision.com/voipsurvivor/2009/12/07/what-layouts-should, Dec. 7, 2009, 3 pages.

Han et al.: "Four-way Video Conference In Home Server for Digital Home", IEEE 10th Int'l Symposium on Consumer Elec.; 2006, pp. 1-6.

Ishikawa et al.: "The Design of a Set-Top Box with Video Encoder and its Applications to Video Conf.", SPIE 3408, Broadband European Netw. + Multimedia Svcs, May 1998, pp. 592-602.

Search Report dated Mar. 23, 2012.

* cited by examiner

TELEPRESENCE COMMUNICATIONS SYSTEM AND METHOD

CROSS-REFERENCE TO RELATED APPLICATIONS

This application claims the benefit, under 35 U.S.C. §365 of International Application PCT/US2011/06036, filed Dec. 2, 2011, which was published in accordance with PCT Article 21(2) on Feb. 7, 2013 in English and which claims the benefit of U.S. provisional patent application No. 61/513,794 filed Aug. 1, 2011.

TECHNICAL FIELD

This invention relates to system and method for sharing content among a distributed audience.

BACKGROUND ART

In the early days of radio and television, a small number of nationwide networks broadcast entertainment for contemporaneous audience consumption, thereby providing a common cultural experience shared by large segments of the population. Now, many more sources of content exist and many content subscribers have the ability to record content for time-shifted viewing or for viewing-on-demand. The ability of individual content subscribers to select content from an ever-increasing array of content has significantly diluted the cultural experience of large audiences viewing the same content simultaneously because of desire of content subscribers to consume the same content as others in their social network at substantially the same time.

Various techniques exist to facilitate the simultaneous sharing of content. For example, U.S. Pat. No. 6,653,545 by Redmann et al., and U.S. Pat. No. 7,518,051 by Redmann both teach a distributed musical performance system that includes a distributed transport control. The distributed musical performance system disclosed in these patents enable substantial synchronization of the execution of commands to play, pause, rewind, fast-forward, and stop media playback at each location, regardless of network latency.

Other efforts to share content include the integration by the cable television network CNN of a video feed of President Obama's inauguration with a parallel Facebook-based feed so participants could see comments made by friends in real-time. Unfortunately, not all participants enjoyed a synchronized video feed, so some comments appeared long before or long after viewing of the actual event.

One company, frog design inc now provides an application for the iPhone called "tvChatter" that uses Twitter as a background service to collect and redistribute contemporaneous commentary for live broadcasts of new television episodes. Unfortunately, content subscribers in an earlier time zone can enter comments about portions of the content net yet viewed by content subscribers in a later time, leading to complaints of "spoiling" the outcome of television programs, which can significantly detract from sharing comments on elimination-based reality shows or suspenseful dramas.

Other efforts to share content include the ability of certain gaming consoles, most notably the Microsoft Xbox 360, to implement a Netflix movie-streaming application that offers the option to "Watch with Party." After a Netflix and Xbox Live account holder logs in, the account holder's Xbox Live avatar becomes the participant's on-screen persona. The participant can select "Start Party" and invite other, Xbox Live and Netflix subscribers currently on-line to join the party. The account holder that initiated the "party" can select movies from the regular Netflix catalog by browsing posters in the hierarchical arrangement (e.g., by theme, by genre, by rating, by similarity to other movies, etc.). Invited party members can select movies, which appear as suggestions. After selection of a suggested movie, the application performs a bandwidth test for video quality. Assuming sufficient bandwidth exists, the application launches, causing an on-screen image of a theatrical venue to appear, and the party members' avatars then enter and take seats. The movie begins playing on the screen within the simulated theatrical venue. The participants can have their corresponding avatars "emote" by selecting one of eight or so choices, in response to which the participant's avatar will make arm gesture and mime catcalls or cheers. A transport control allows the party members to pause, rewind, fast-forward, and resume playback across all the party member platforms.

Another example of content sharing includes video conferencing. Many organizations now maintain special facilities for video conferencing that offer one or more video screens and video cameras. Using such a facility, a panel of participants can "meet" with one or more participants at one or more remote sites. Such video conferencing facilities allow the sharing of presentation materials, for example Microsoft PowerPoint® slides. Further, such video conferencing facilities can include special video cameras for capturing images of physical documents to share among participants. Several vendors, including Cisco Systems, sell cameras, monitors, lighting systems, and video networking equipment to establish a video conferencing facility having the ability to exchange video and audio among other video conferencing facilities.

Cisco has also published a telepresence interoperability protocol (TIP) to improve the ability of video conferencing facilities to interoperate with each other even when using equipment from different manufacturers. The Internet Engineering Task Force now has under review a more general but competing standard "Controlling Multiple Streams for Telepresence" (CLUE).

Despite the various efforts to share content, difficulties persist. Thus, a need exists for a system, which affords simultaneous sharing of content across a distributed audience.

BRIEF SUMMARY OF THE INVENTION

Briefly in accordance with a preferred embodiment of the present principles, a method for sharing an image of a local participant in a group with at least one other participant in that group commences by establishing, for that local participant, orientation information indicative of an orientation of the local participant relative to a display screen and a video camera. The local participant sends his or her image of the local participant along with the orientation information to at least one other participant. The orientation information enables display of the image of the local participant with a common orientation recognized by the at least one other participant.

DETAILED DESCRIPTION

Figure 1:
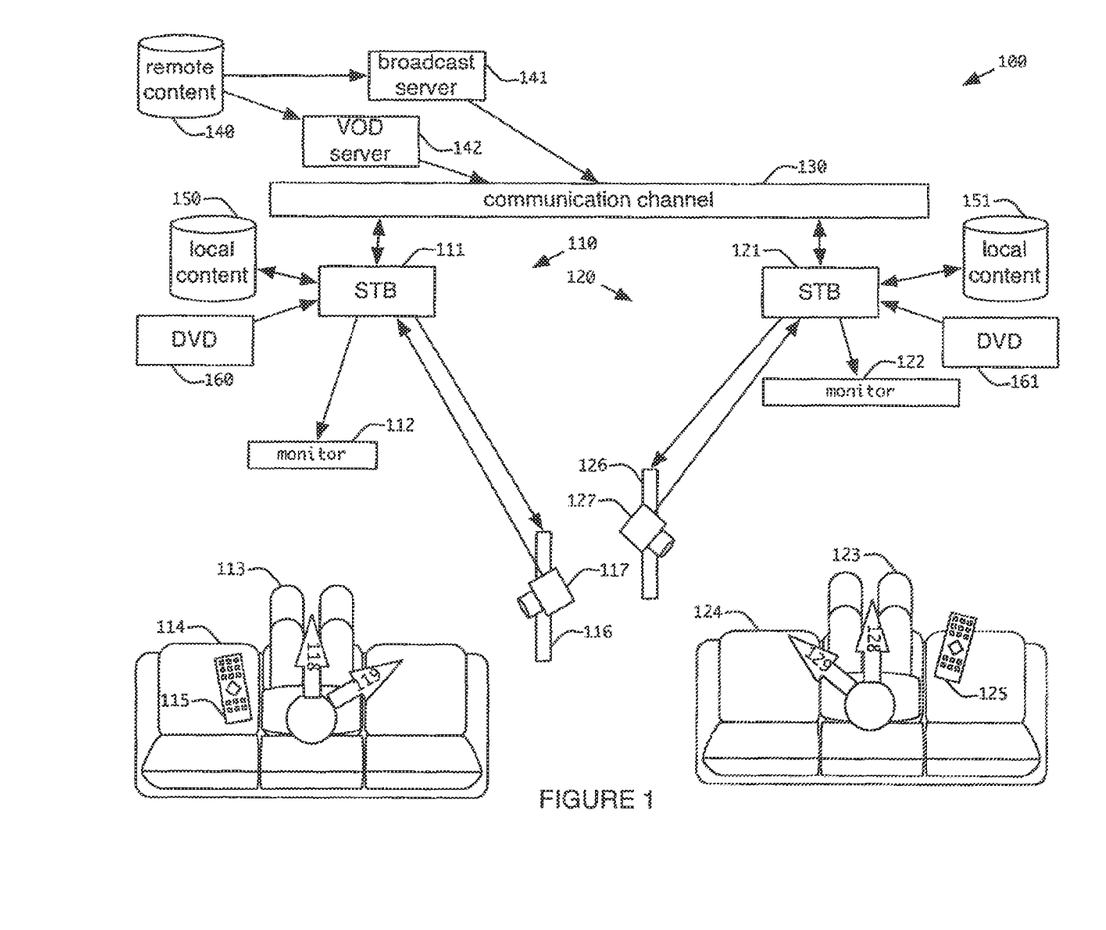
FIG. 1 depicts a block diagram of a first embodiment of telepresence system having two sites for allowing participants to share images of each other in a common orientation in accordance with a preferred embodiment of the present principles.

FIG. 1 shows distributed participant telepresence system 100 deployed in sites 110 and 120 connected via communication channel 130, which typically comprises the Internet. The sites 110 and 120 can comprise various rooms in a private residence, such as a living room, bedroom, or den, or can comprise a location in a commercial establishment such as a hotel or conference center or meeting place (e.g., a sports bar). At each of sites 110 and 120, distributed participants 113 and 123 sit, typically ensconced in comfortable couches 114 and 124, respectively, with access to handy remote controls 115 and 125, respectively. The site 110 has a shared content monitor 112 which displays content, while the same content plays out on a content monitor 122 at the site 120. For this reason such content bears the designation "shared content."

The site 110 has a telepresence monitor 116, which displays images captured by a remote telepresence camera 127 situated at the site 120, whereas a telepresence monitor 126 resides at the site 120 to display images captured by a remote telepresence camera 117 at the site 110. Throughout this discussion, the "facing" of a telepresence monitor (e.g., telepresence monitors 116 and 126) and the corresponding telepresence camera associated with each monitor (e.g., the telepresence monitors 117 and 127) relates to the relative orientation considered with respect to the corresponding shared content monitor (e.g., the shared content monitors 112 and 122). In some instances, the terms "left" or "right" serve to summarily define the orientation. In other words, the telepresence monitor/camera pair, when viewed by a local participant using both the shared content monitor and the telepresence monitor/camera, will appear to the participant's left or right as the local participant faces the shared content monitor. A microphone (not shown) serves to capture audio from the participant 113. Typically, the microphone resides in or near the camera 117 or the monitor 116. One or more audio speakers (not shown), located in or near monitor 116, serve to playout audio from remote participant 123. Similarly, a microphone (not shown) serves to capture audio from the participant 123. Typically, the microphone resides in or near the camera 127 or monitor 126. One or more audio speakers (not shown), located in or near monitor 126, serve to playout audio from remote participant 113. In an alternative embodiment, the microphones can reside anywhere within their respective sites 110 and 120 and the speakers (not shown) can reside other than near the corresponding monitors 116 and 126. Further, one or both of the sites could include one or more speakers in a surround array (not shown) driven by a communications device, for example at site 110, the communications device is illustratively depicted by a Set-Top- Box (STB) 111, which could carry the audio from the microphone at the remote site 120.

In one exemplary embodiment, the source for shared content could comprise content 140 mutually remote from sites 110 and 1120 which both sites 110 and 120 obtain from either of a broadcast server 141 or a video-on-demand (VOD) server 142, both accessible through communication channel 130. In another exemplary embodiment, the shared content could comprise content 150 locally stored by virtue of being previously downloaded or recorded by the set-top box (STB) 111 at the site 110, using a well-know personal video recorder (PVR) system. Similarly, the shared content could originate from a DVD player 160. In either case, the STB 111 would accept the shared content for streaming to a remote STB 121. At the same time, the STB 111 could play out such content locally on a shared content monitor 112. Upon receipt of shared content received by STB 121, the STB would playout the shared content monitor 122 with or without buffering.

If desired, all or part of the total delay caused by transport latency to, and the buffering by, the STB 122 can serve to define a locally imposed delay adopted by the STB 111 before playout begins on the shared content monitor 112. This delay from the remote participant creates a minimum temporal disparity between the content viewed by the distributed participants 113 and 123. In still another example, the shared content can reside locally at each site. For example, each of the STBs 111 and 121 can previously download or record the same shared content as local content 150 and 151, respectively. Alternatively, each of DVD players 160 and 161 (or such other physical media players) can possess the same content. Under such circumstances, the STBs 111 and 121 will implement a distributed transport process, (such as taught in U.S. Pat. No. 6,653,545 by Redmann et al., and U.S. Pat. No. 7,518,051 by Redmann) whereby the corresponding STBs 111 and 121 accept the same play, pause, forward, and rewind commands from the remote controls 115 and 125, respectively, for distribution to the corresponding remote STBs 121 and 111, respectively for substantially simultaneous execution. This allows the playout of shared content at each site to remain substantially synchronized, regardless of the transport control operations entered by the participants 113 and 123. A similar distribution of transport controls can occur with respect to the broadcast server 141 or the VOD server 142, whereby the stream control commands issued from each of STBs 111 and 121 get shared among themselves before issuance to the stream controllers in the STBs responsible for managing the independent remote content streams from the servers 141 and 142.

In accordance with the present principles, the arrangement of the monitors 112, 116, 122, and 126, and the cameras 117 and 127 occurs in such a way as to provide a psychological impression of a common space. Since the camera 117 faces the participant 113, when the participant 113 looks in the direction 119 (toward the telepresence monitor 116), the image of the participant 113 displayed on the telepresence monitor 126 appears to look toward the participant 123. Likewise, when the participant 123 looks in the direction 129

(toward the camera 127), the image of the participant 123 displayed on telepresence monitor 116 appears to look toward the participant 113.

When the participant 113 looks in the direction 118 (toward shared content monitor 112), the image of the participant 113 on the telepresence monitor 126 appears to look toward the shared content monitor 122, since camera 117 captures a partial profile of the participant 113 to provide the illusion of looking toward the shared content monitor 112. Likewise, when the participant 123 looks in the direction 128 (toward the shared content monitor 122), the partial profile captured by camera 127 will undergo display on the telepresence monitor 116 so that the image of participant 123 appears to look toward the shared content monitor 112.

Figure 2:
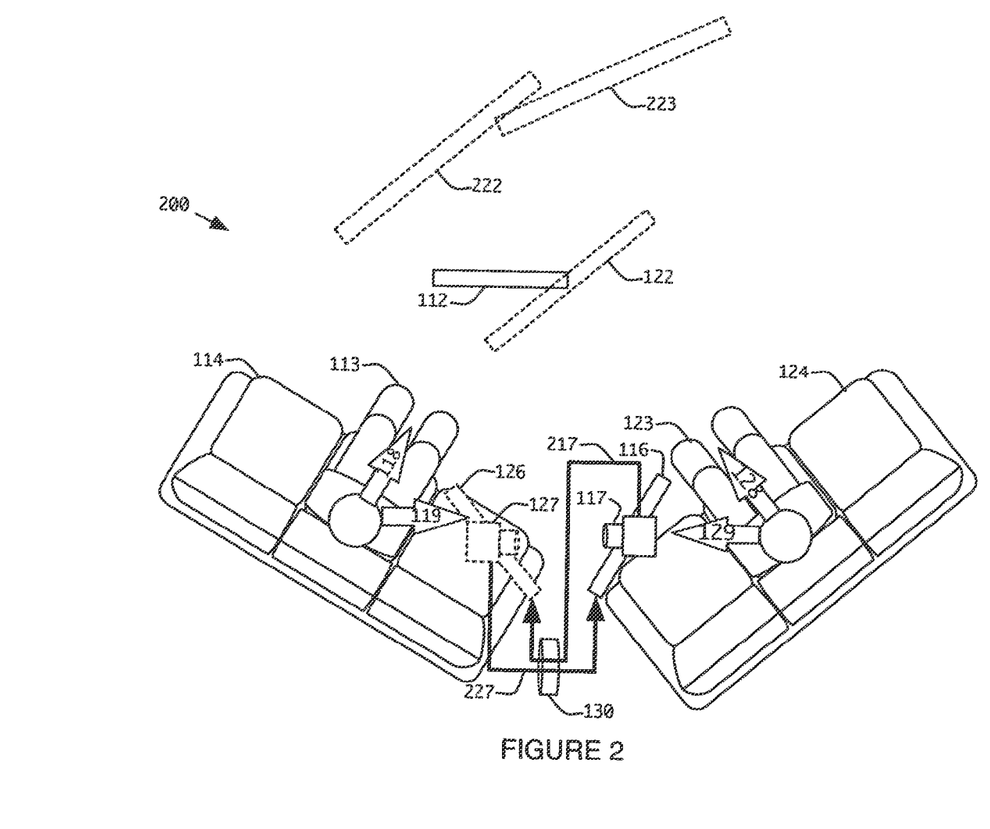
FIG. 2 depicts a plan view of separate participants of the telepresence system of FIG. 1 showing the effect perceived by participants during system use.

FIG. 2 illustrates how the overall effect of the superposition 200 of the two sites 110 and 120 appears when linked by the telepresence system 100. In particular, FIG. 2 illustrates the telepresence experience with respect to the distributed participant 113, still sitting on the couch 114 and watching the shared content on the monitor 112 by looking in the direction 118. However, when the participant 113 looks in the direction 119 to see the telepresence monitor 116, the image presented appears from the vantage of the camera 127 (shown by dotted lines in FIG. 2 because the camera cannot be viewed by the participant 113). Thus, the image shows the participant 123 and perhaps some of the couch 124. The video feed 227 from the camera 127 gets sent via the communication channel 130 for display on the telepresence monitor 116. (Likewise, the video feed 217 from camera 117 gets sent via communication channel 130 for display on the telepresence monitor 126.)

When the participant 123 looks in the direction 129 (towards the screen 126 or the camera 127), the participant 113 will perceive that the participant 123 looks directly at him or her. However, when the participant 123 looks in the direction 128 toward the shared content screen 122 (also shown by dotted lines because the shared content screen cannot be viewed by the participant 113 since the screen lies outside the view of camera 127); the participant 113 will perceive that participant 123 looks in the direction of shared content monitor 112. This perception will survive even if shared content monitor 122 were replaced by different-sized or differently placed monitors 222 and 223. The illusion of viewing the shared content at a common location remains strong.

Figure 3A:
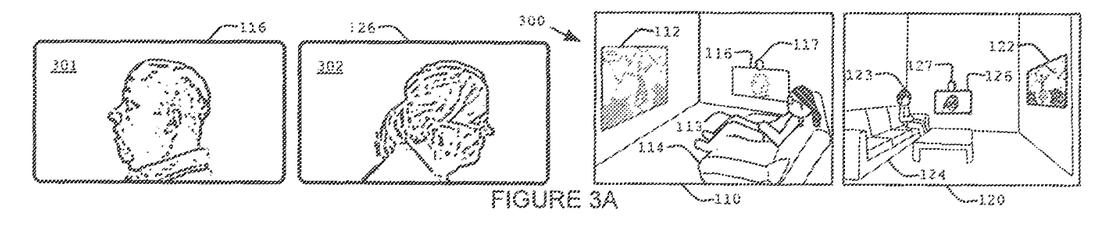
FIGS. 3A, 3B, and 3C illustrate three separate examples of participant interactions during operation of the telepresence system of FIG. 1.
Figure 3B:
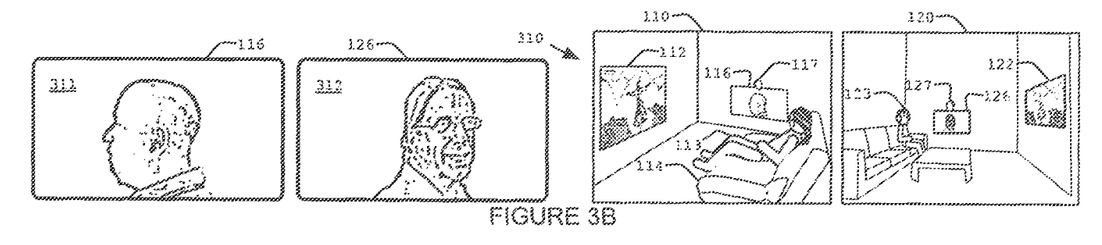
Figure 3C:
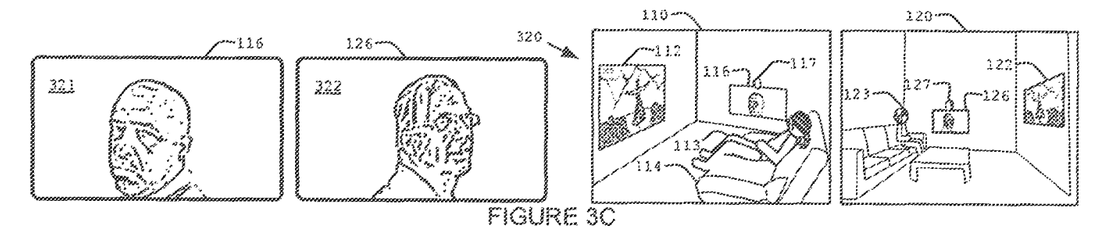

FIGS. 3A, 3B, and 3C depict different views of the resulting effect discussed above, thus representing a brief interaction between the distributed participants while synchronously watching shared content on the monitors 112 and 122. FIG. 3A depicts a situation 300 in which the participants 113 and 123 look toward the corresponding shared content screens 112 and 122, respectively. In this situation, the video cameras 117 and 127 transmit images 302 and 301, respectively, for display on the monitors 126 and 116, respectively. In FIG. 3A, the participant 113 looks at the screen 112, so the image 302 from the camera 117 shows the participant 113 in at least a partial profile. Similarly, the participant 123 looks at the screen 122, so the image 301 from the camera 127 shows the participant 123 in at least a partial profile.

The image 301 represents the participant 123 reacting to something with surprise. In FIG. 3B, the situation 310 corresponds to the participant 113 noticing the reaction of the participant 123 through the image 301 on the screen 116, turns to face the screen 116 (and therefore, the camera 117), and comments jokingly to participant 123. As a result, the image 312 from the camera 117 shows participant 113 directly in facing the camera. At the site 120, the participant 113, on telepresence monitor 126, appears to look at the participant 123. The participant 123, still looking at the screen 122 while he or she thinks of a retort, still appears in a partial profile in the image 311. However, in FIG. 3C, the situation 320 shows the participant 123 turned toward the image 322 displayed on the monitor 126 and therefore, the participant 123 appears turned toward the camera 127. In contrast, the image 321 appearing on the monitor 116 shows the participant 123 straight on, therefore appearing to look directly at the participant 113.

FIGS. 1 and 2 illustrate a special case, in which the monitor/camera pairs 116 and 117 and monitors 126 and 127 reside on opposite sides of their corresponding participants 113 and 123. In other words, the monitors 116 and 117 lie to the right of the participant 113 (relative to his facing shared content monitor 112), but the monitors 126 and 127 lie to the left of the participant 123 (relative to his facing shared content monitor 122). This configuration supports the perception on the part of each local participant of a shared, commonly-shaped space in which the remote participant appears to share viewing of the local screen (monitors 112 or 122) with the corresponding local participant.

Figure 4:
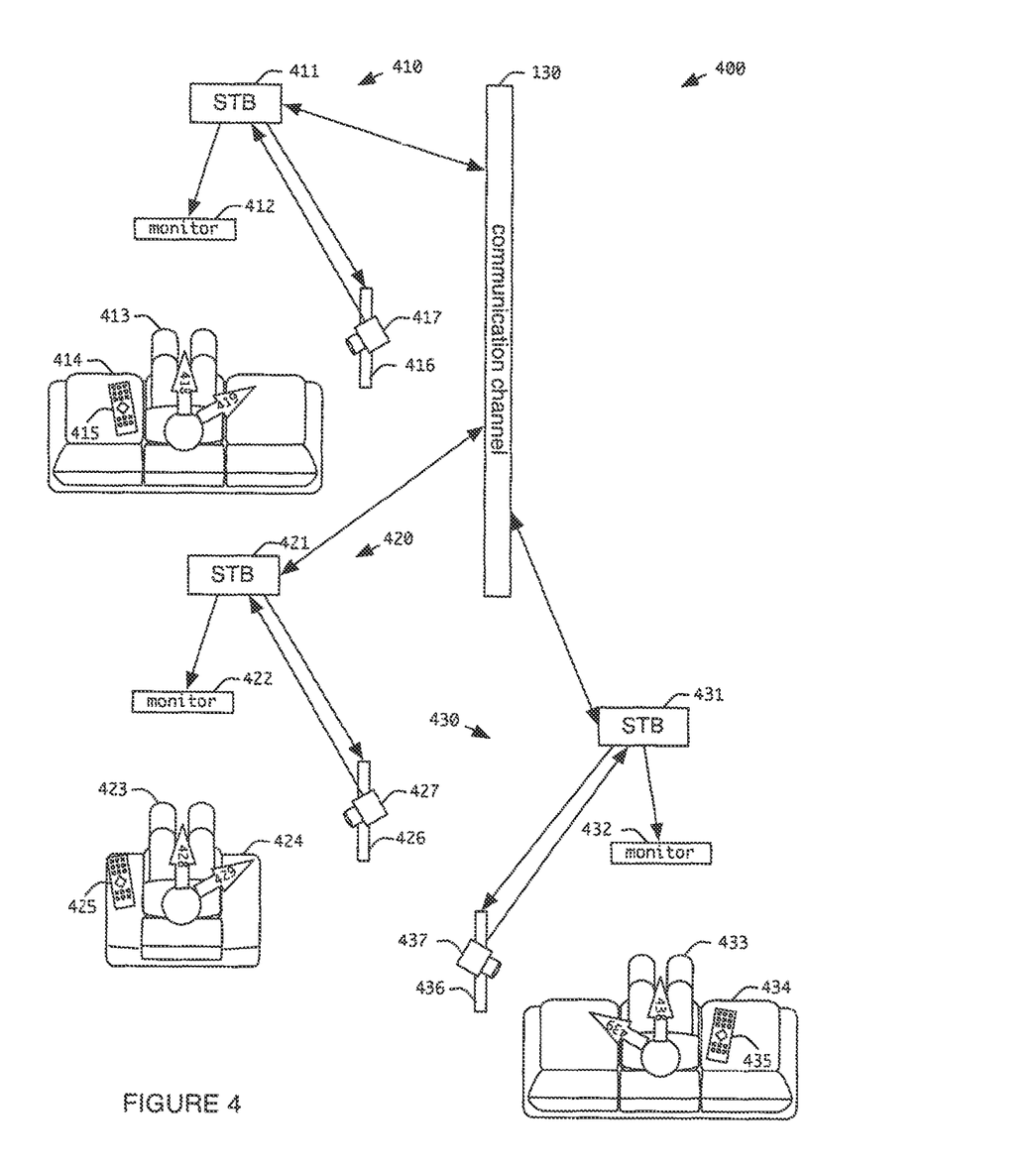
FIG. 4 depicts a block diagram of a second embodiment of telepresence system having multiple sites for allowing participants to share images of each other in a common orientation, in accordance with a preferred embodiment of the present principles.

FIG. 4 depicts a telepresence system 400 having three sites 410, 420, and 430, each having set-top boxes 411, 421, and 431, respectively; shared monitors 412, 422, and 423, respectively, telepresence monitors 416, 426, and 436, respectively; telepresence cameras 417, 427, and 437, respectively; and remote controls 415, 425, and 435, respectively, for use by the distributed participants 413, 423, 433, respectively, sitting on the couches 414, 424, and 434, respectively. Each participant 413, 423, and 433 looks in a forward direction 418, 428, and 438, respectively, to view their corresponding shared screens 412, 422, and 432, respectively. The participants 413 and 423 look rightward in the directions 419 and 429, respectively, to view their respective telepresence monitors 416 and 426; while the participant 433 looks leftward in a direction 439 to view his or her respective telepresence monitor 436.

In FIG. 4, the participant sites 410 and 420 have their telepresence monitors on the same side of the participant seating position. In this configuration, a direct relay of the image from the camera 427 will appear to show on telepresence monitor 416 that remote participant 423 faces the wrong way, that is, away from the shared content monitor 412. The STB at either or both ends of the connection over communication channel 130 will correct this anomaly using one of several techniques. For example, a sending STB (e.g., the STB 421) can notify each receiving STB (e.g., the STB 411), that its associated telepresence camera 427 resides to the right of its associated participant. Upon receipt of the images from the camera 427, the STB 411 can decide how to display that image on the telepresence monitor 416. Since the telepresence monitor 416 associated with the receiving STB 411 lies on the same side (right) of its associated participant 413, the STB 411 would need to flip the image received from camera 427 and STB 124 left-to-right so that the image of the remote participant 423 appears on the telepresence monitor 416 to face the shared content monitor 412. This approach affords the advantage that, for any number of connections to remote STBs, a sending STB need only send one image format.

Using a different approach, the receiving STB (e.g., the STB 411) could notify each sending STB (e.g., the STB 421) that its associated telepresence camera 417 lies to the right of its associated participant 413. Before sending an image from the camera 427 to the STB 411, the STB 421 can decide whether to flip the image left-to-right so that the image sent to the STB 411 has the correct orientation for display on telepresence monitor 416. This approach has the advantage that all inbound video signals have the correct orientation and can readily undergo display on the telepresence monitor. However, a horizontal flip of a video signal does not entail a terribly heavy computational process, and incurs a downside risk that the sending STB 421 might need to create two different streams, for oppositely arranged sites 410 and 430.

A third approach obviates the need to share arrangement notifications: Each sending STB (e.g., the STB 421) will format the image from its corresponding telepresence camera 427, that is, the STB will flip the image or not, so that the image emulates a predetermined configuration, for example, a camera to the right of corresponding local participant 423 (which in the case of site 420, happens to be the actual case). All receiving STBs (e.g., the STB 411 and the STB 431) assume this predetermined configuration, and act accordingly for the video signals they receive. In the case of site 410, where since the actual monitor 416 lies to the right of local participant 413, STB 411 will need to flip all received telepresence video signals (regardless of their source). However, in the case of the site 430, where the actual monitor 436 lies to the left of the local participant 433, the STB 431 will never need to flip any received telepresence video.

However, under this third approach, in order to send telepresence video to other sites 410 and 420, the STB 431 will need to horizontally flip the video from the telepresence camera 437. Given that a horizontal flip does not require heavy computation, the STBs 411 and 421 residing in the sites 410, 420 configured with the telepresence monitors 416 and, 426 to the right of local participants 413 and 423, respectively, would not incur an onerous burden by the requirement to flip all inbound telepresence video. Further, this approach for achieving a configuration change remains a local matter: Assuming an initial error in the setting representing the local configuration of the STB and a later correction, the setting change and altered behaviors remain strictly local. This remains true even though the correction results in video coming from properly configured remote sites now showing correctly, and the outbound video sent to those remote sites also now appearing correctly.

Figure 5:
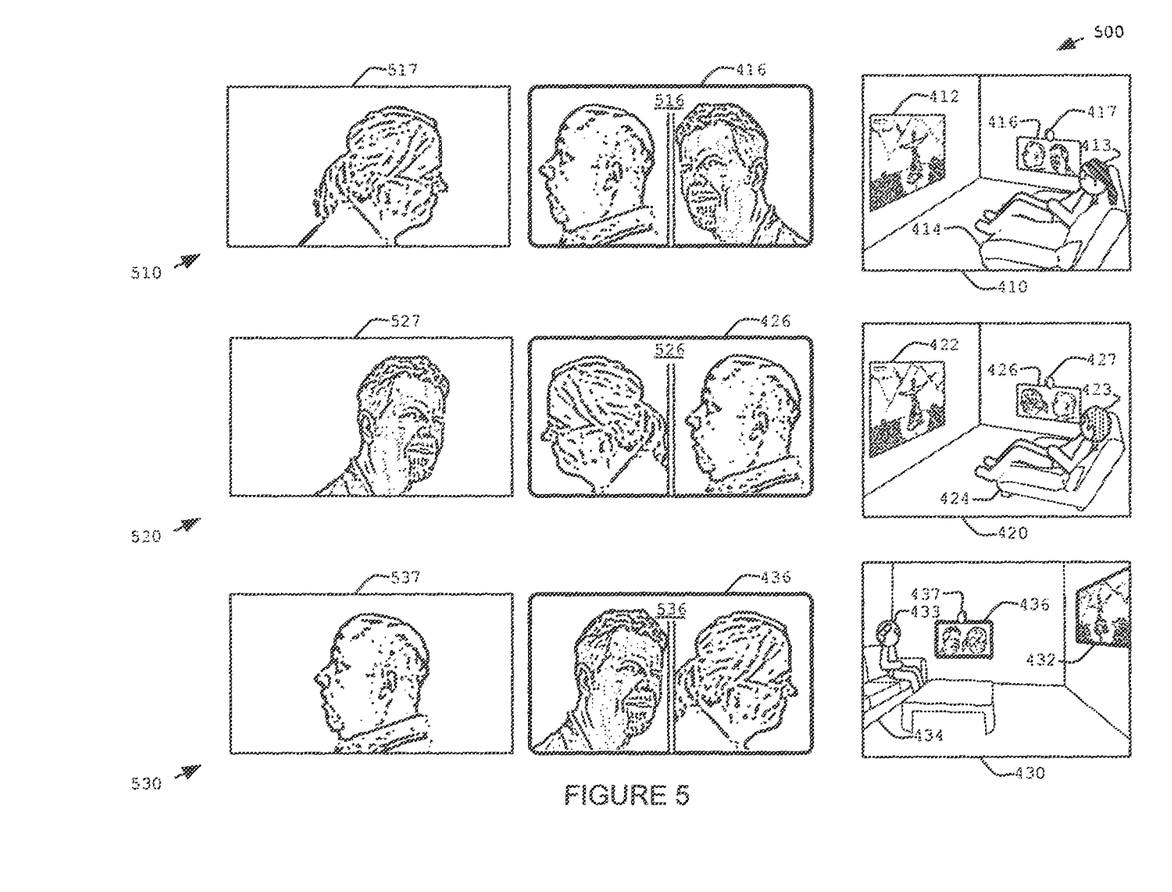
FIG. 5 illustrates examples of participant interactions through the telepresence system of FIG. 4.

The end result of these three methods remain the same and appear in FIG. 5, where a distributed situation 500 combines the substantially simultaneous local situations 510, 520, 530 in each of sites 410, 420, and 430, respectively. At the site 410, the situation 510 comprises the image 517 of local participant 413 as captured by telepresence camera 417. Likewise, at the site 420, the situation 520 comprises the image 527 of the local participant 423 as captured by the telepresence camera 427; and at the site 430, the situation 530 comprises the image 537 of the local participant 433 as captured by the telepresence camera 437. At each site 410, 420, and 430, the corresponding shared monitors 412, 422, and 432 show the same video program in substantial synchronization with each other.

Each of situations 510, 520, and 530 also includes a local image containing video information from each of the respective remote telepresence camera pairs 427 and 437, 417 and 437, and 417 and 427, displayed on the local telepresence monitors, 416, 426, and 436, respectively. However, in some cases, the information from the respective remote telepresence cameras appears flipped: The image 516 shown on the telepresence monitor 416 comprises one panel depicting at least a portion of the unflipped image 537, and a second panel shows at least a portion of the horizontally flipped image 527. The image 526 on the telepresence monitor 426 comprises one panel showing at least a portion of the horizontally flipped image 517, and a second panel showing at least a portion of the unflipped image 537.

The image 536 on the telepresence monitor 436 comprises two panels, each displaying at least a portion of a different one of the images 517 and 527, neither of which is horizontally flipped. The portions of the images 517, 527, and 537 appearing in the panels of image 516, 526, and 536, respectively, whether flipped horizontally or not, can undergo cropping and/or scaling to achieve certain aesthetic goals, including filling the allocated portion of the screen, and/or making the object in the images believably appear life-sized.

Figure 6:
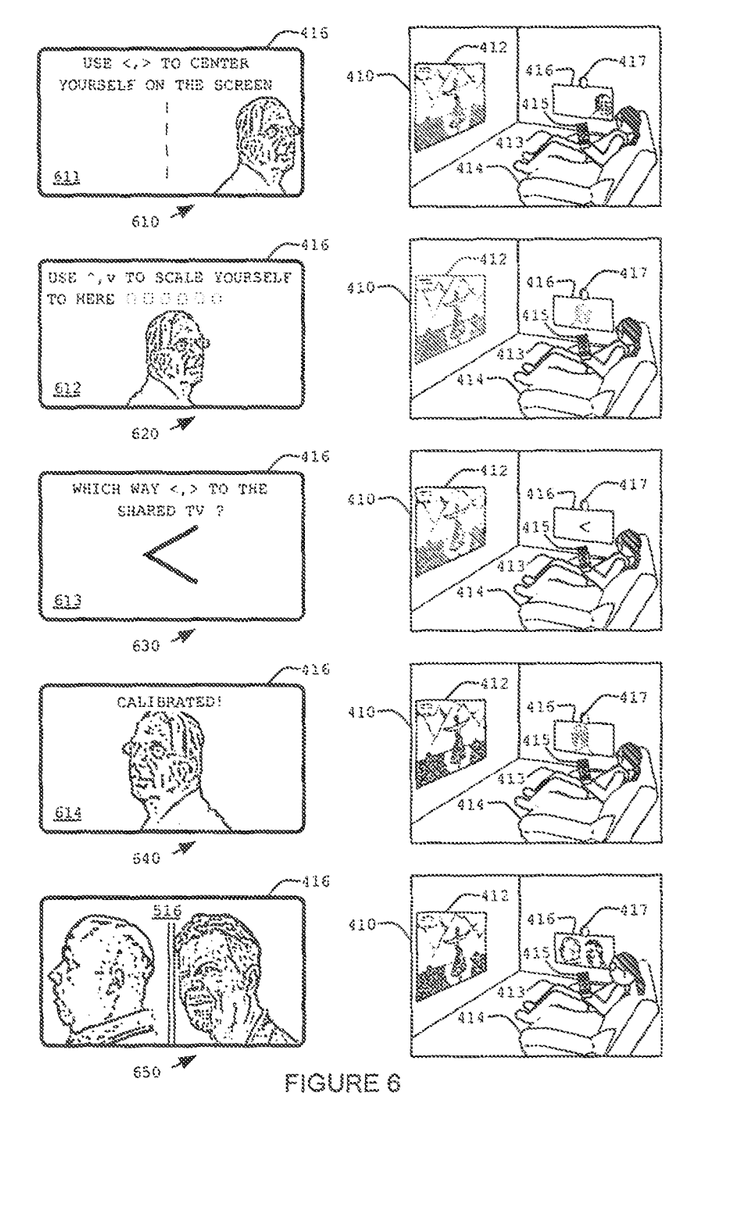
FIG. 6 illustrates an exemplary participant interface employed to adjust a site of the telepresence system of FIG. 1.

FIG. 6 depicts an exemplary process for setting the configuration of a site (e.g., the site 410) of the telepresence system 400. The method begins with step 610 with the display of the image 611 on the telepresence monitor 416. The image 611 includes the image acquired by the camera 417 and a text instruction to the local participant 413 (which can include, or be presented as, audio). The instruction tells the participant how to use specific controls on his or her remote control 415, to center the image of the participant's own head on the telepresence screen 416. The instructions typically appear as a text overlay on the video from camera 417 and/or an audio program provided by the STB 411. This adjustment takes place while the local participant 413 sits in a normal viewing position (e.g., sitting in the participant's accustomed position on the couch 414). This participant interface that occurs during step 610 presumes either that the camera 417 has a motorized mount (not shown) controllable with the remote control 415 (whether through STB 411 or otherwise), or alternatively that the camera 417 has a sensor area detecting an image larger than that displayed as image 611 allowing electronic pan-and-scan adjustment by control electronics in the camera 417 or the STB 411 to ultimately obtain a centered picture.

In an alternative embodiment, during step 610, an instruction could direct the participant 413 to manually adjust the camera 417 so that again, when seated, the participant's head appears centered in the image 611 as displayed on the screen 416.

During step 620, the instruction, which appears in the image 612 shown on the monitor 416, will direct the participant 413 to adjust the scale of the participant's head in the image, using the appropriate controls on the remote control 415. This presumes that the camera 417 has a remotely controllable motorized zoom lens, or that the image captured by camera 417 can undergo electronic scaling by either the control electronics in the camera 417, or by the STB 411. Alternatively, during step 620, an instruction could direct participant 413 to manually adjust the zoom lens of the camera 417 to provide a properly scaled head in the image 612 when seated.

During step 630, the instructions appearing in the image 613 shown on the telepresence monitor 416 direct the local participant 413 to use controls on the remote control 415 to indicate whether the shared monitor 412 lies to the left or right of the telepresence monitor 416. The image 613 can comprise a purely graphically image generated by the STB 411. Such an image will change in response to inputs made by the participant 413 using the remote control 415.

In yet alternative embodiment of the process depicted in FIG. 6, during step 630, the instruction asking for an indication of the whether the telepresence monitor 416 lies to the right or left of shared monitor 412 might instead illustrate the two possible setups, each with the telepresence monitor on the opposite side of the shared monitor. Further, the instruction could select which of the two configurations appears more like the participant's 413 environment 410. During step 640, information in the image 614 on monitor 416 would alert the participant 413 that the camera 417 and the STB 411 have undergone calibration. During step 650, the system can interact with remote the STBs 421 and 431 to receive images of the remote participants 423 and 433, respectively, from remote telepresence cameras 427 and 437 respectively, to create an image 615 in which the images of the remote participants 423 and 433 correctly face the shared screen 412.

Figure 7:
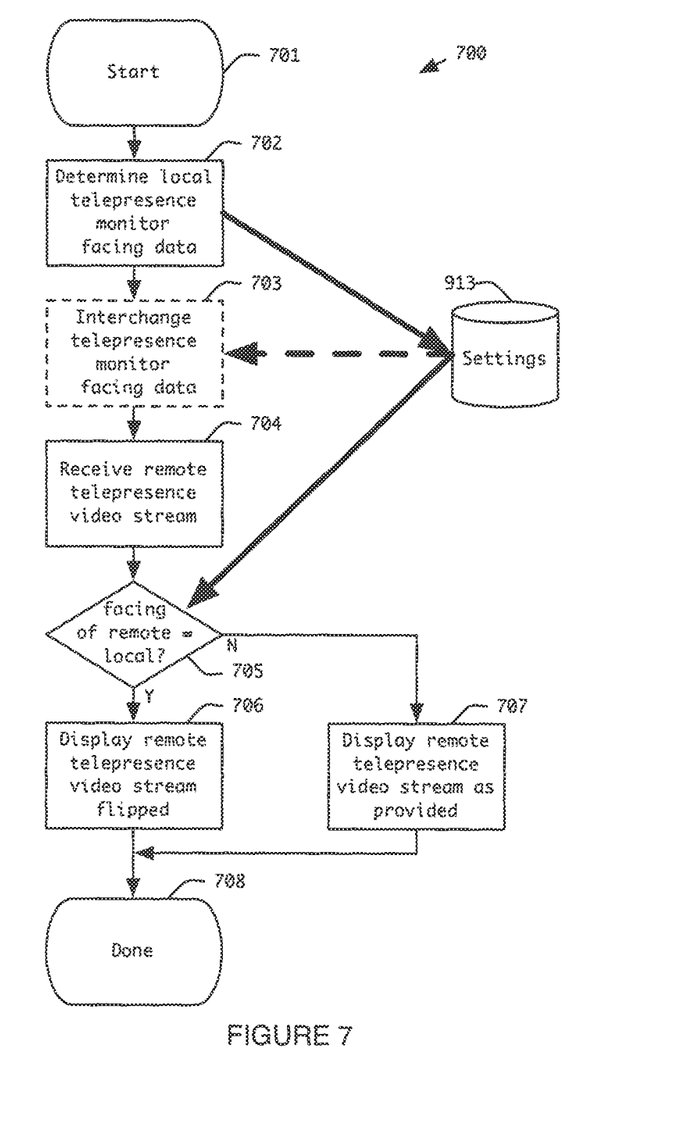
FIG. 7 depicts a flowchart of an exemplary process for preparing and transmitting video information from one site of the telepresence system of FIG. 1 to another site.

FIG. 7 shows a telepresence video reception process 700, which begins during step 701 with local camera (e.g., the camera 417), the local telepresence monitor (e.g., the monitor 416), and the local STB (e.g., the STB 411) ready, and presently connected to one or more remote sites (e.g., the sites 420 and 430) through the communications channel 130 of FIG. 4. During step 702 of FIG. 7, acquisition of "facing data" occurs. The term "facing data" refers to the data representing the substantially coincident location of the local telepresence monitor 416 and camera 417. Such data acquisition occurs in response to participant input obtained during step 630 following the display of appropriate the instructions to the participant. The facing data, which indicates that the monitor and camera reside to the right of shared monitor 412 in this example, gets recorded in the settings 713 part of the STB, for example in setting portion of the STB 411 of FIG. 4.

During step 703 of FIG. 7, the facing data corresponding to either the local or remote telepresence monitors gets exchanged. In those embodiments where the facing data indicative of position of the remote telepresence monitor (e.g., 426, 436) becomes necessary in order to properly flip horizontally the corresponding inbound video signals, the STB 411 will receive such facing data during step 703 and store such data in the settings portion in the database 713 in STB 411. In those embodiments where the remote STBs (e.g., the STBs 421 and 431) or a fan-out server (not shown) provide video already formatted for the facing of local telepresence monitor 416, the local facing data undergoes transmission to the remote sites 420 and 430 during step 703. In some instances, the facing data can take the form of metadata embedded within the video signals sent and received.

In the event that the effective facing of all video signals being sent within system 400 have a predetermined conventional facing and that both sending and receiving systems will horizontally flip the outbound or inbound video signals as needed relative to their own actual configuration (as discussed above in conjunction with FIG. 4), then step 703 becomes unnecessary and gets skipped, with no changes to the settings portion of the STB made during step 713.

During step 704, receipt of the video stream from a remote STB (e.g., the STBs 421 and 431) and a camera (e.g., the corresponding cameras 427 and 437) occurs.

During step 705A, a determination occurs whether the facing data of the remote telepresence monitor (426, 436) equals the facing data of the local telepresence monitor (416). If the two facing data equal each other, that is, the local and remote telepresence monitors reside on the same side of their corresponding shared monitors (as would be the case for telepresence monitors 416 and 426), then during 706, the video stream received from the remote site (420) gets flipped horizontally before being displayed on local telepresence monitor 416. If during step 705A, the two facing data do not each other, that is, the local and remote telepresence monitors reside on opposite sides of the corresponding shared monitors (as would be the case for telepresence monitors 416 and 436), then during 707 the video stream received from the remote site 430 undergoes display on local telepresence monitor 416. Under circumstances when the facing data for local monitor 416 is provided to the remote telepresence STBs 421 and 431 during step 703 with the expectation that the remote sites will format the video stream, then the test performed during step 705A becomes unnecessary and the process always proceeds through step 707. This is because the remote site STBs 421, 431 have to ensure that the video received during step 704 can undergo display on local telepresence monitor 416.

In embodiments where the effective facing of all video signals being sent within system 400 have a predetermined conventional facing, step 705B replaces step 705A, and at 705B the test compares the conventional facing with the facing data of the local telepresence monitor (416), with the same outcome as described above, namely, if equal then processing continues at step 706, but if unequal then processing continues at step 707.

Figure 8:
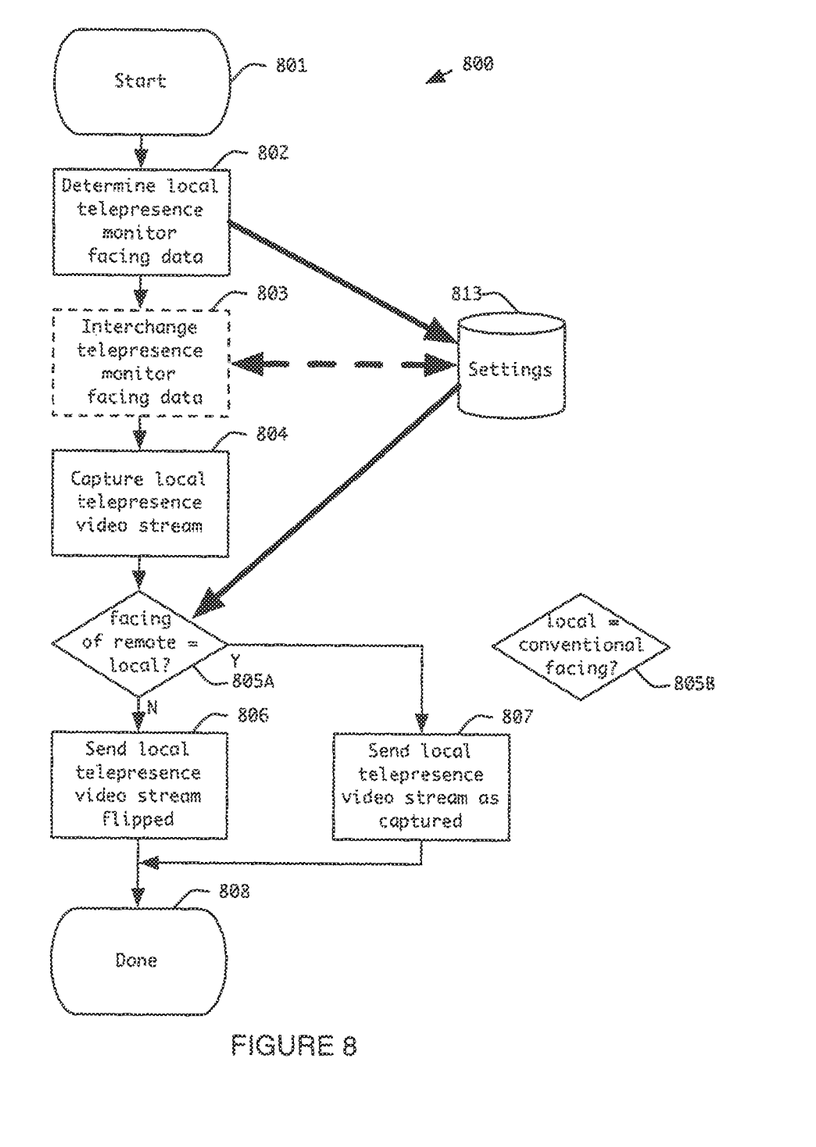
FIG. 8 depicts a flowchart of an exemplary process of preparing and displaying video information received from a remote site of the telepresence system of FIG. 1.

FIG. 8 shows telepresence video transmission process 800, which begins during step 801 with the local camera (e.g., the camera 417), the local telepresence monitor (e.g., the monitor 416), and the local STB (e.g., the STB 411) ready, and connected to one or more remote sites (e.g., the sites 420 and 430) through the communications channel 130. During step 802, acquisition of facing data representing the substantially coincident location of the local telepresence monitor 416 and camera 417 occurs. Typically, the local participant enters such data following instructions displayed during step 630. The facing data in such circumstances indicate that the monitor and camera lie to the right of shared monitor 412. The data gets recorded in the settings portion in the database 813 in the STB 411.

During step 803, exchange of facing data corresponding to either the local or remote telepresence monitors occurs to the extent necessary. In those circumstances when the facing data of the remote telepresence monitor (e.g., 426, 436) becomes necessary in order to properly flip horizontally the corresponding outbound video signals, the facing data received during step 803 undergoes storage in the setting portion in the database 813. In those circumstances when the remote STBs (e.g., STBs 421 and 431) or a fan-out server (not shown) should receive a common video signal from the local site 410, then during step 703, the remote sites 420 and 430 receive the facing data for local telepresence monitor 416 in accordance with the settings stored in the database 813. In some instances, the facing data can take the form of metadata embedded within the video signals sent and received.

Under circumstances when (a) the effective facing of all video signals being sent within the system 400 comprises predetermined conventional facing data, and (b) both sending and receiving systems horizontally flip the outbound or inbound video signals as needed relative to their own actual configuration (as discussed above in conjunction with FIG. 4), step 803 becomes unnecessary and gets skipped, with no changes to the settings portion stored in the database 813.

During step 804, the STB 411 accepts the video signal from local telepresence camera 417.

Under circumstances when the sending site 410 needs to format the video from the local telepresence camera 417 for display on the remote telepresence monitors 426 and 436, then a check occurs during step 805A, to determine whether the facing data of the remote telepresence monitor 426 and 436 equals that of the local telepresence monitor 416. If the facing data equal each other, that is, the local and remote telepresence monitors reside on the same side of their corresponding shared monitors (as would be the case for telepresence monitors 416 and 426), then during step 806, the video stream obtained at 804 from the local telepresence camera 417 gets flipped horizontally before transmission to the remote site 420 for display on the local telepresence monitor 416. If during step 805A, the two facing data are unequal, that is, the local and remote telepresence monitors reside on opposite sides of the corresponding shared monitors (as would be the case for telepresence monitors 416 and 436), then during step 807 the video stream obtained at 804 from the local telepresence camera 417 is sent to remote site 430 as provided.

Under circumstances where all telepresence video sent should have conventional facing data, e.g., all of the sites 410, 420, 430 should flip the telepresence video from their local telepresence cameras 417, 427, 437, respectively, as if they were located to the right of their corresponding shared monitors 412, 422, 432; respectively, then instead of the determination made during step 805A, a different determination occurs during step 805B. If the facing data for the local telepresence monitor 416 already matches the conventional facing (as would be the case, in this example), then the video gets sent as collected during step 807. However, if the local facing data does not match the conventional facing data (as would be the case, in this example, for site 430, telepresence camera 437, and telepresence monitor 436), then during step 806 the local telepresence video gets flipped horizontally before being sent to the remote sites.

Under circumstances when the facing data for local monitor 416 gets provided to the remote telepresence STBs 421 and 431 during step 803, with the expectation that the remote sites will format the video stream they receive before displaying it, then the checks made during steps 805A and 805B become are unnecessary. Thus, the process will proceed through to step 807, because the remote site STBs 421 and 431 will manipulate video obtained during step 804 as needed for display on the remote telepresence monitors 426 and 436.

Figure 9:
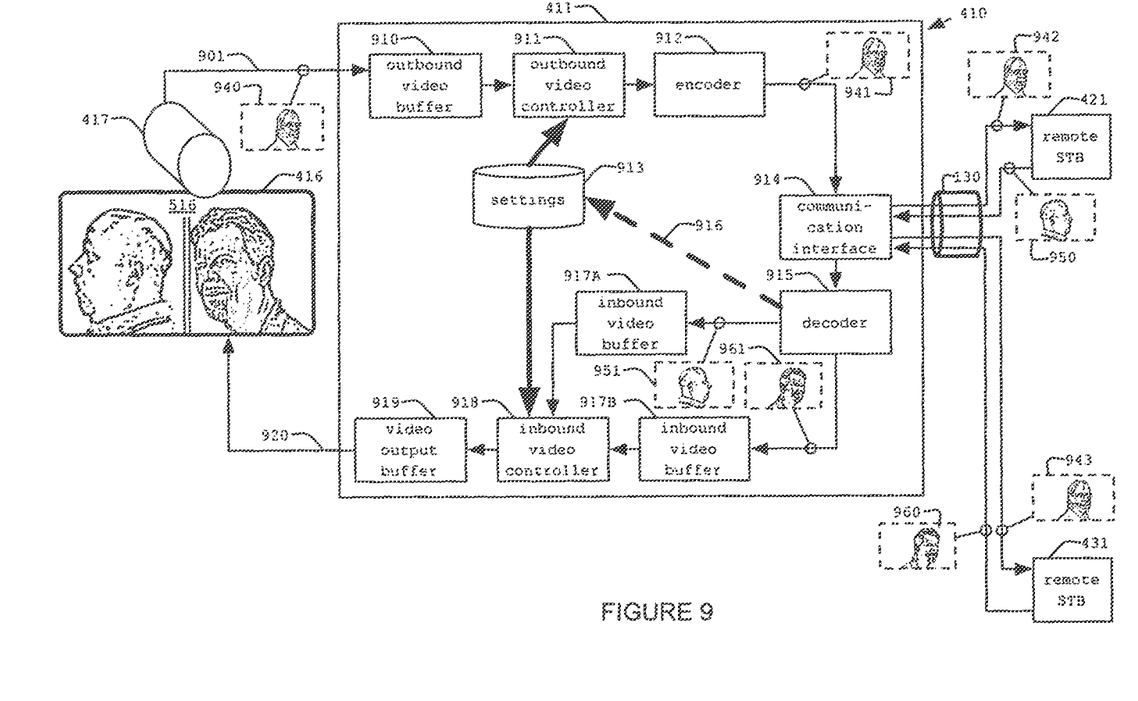
FIG. 9 depicts a block diagram showing the details of a first embodiment of a communications device in the form of a set-top box comprising part of the telepresence system of FIG. 1; and, FIG. 10 depicts a block schematic diagram of a second embodiment of a communications device in the form of a set-top box comprising part of the telepresence system of FIG. 1.
Figure 10:
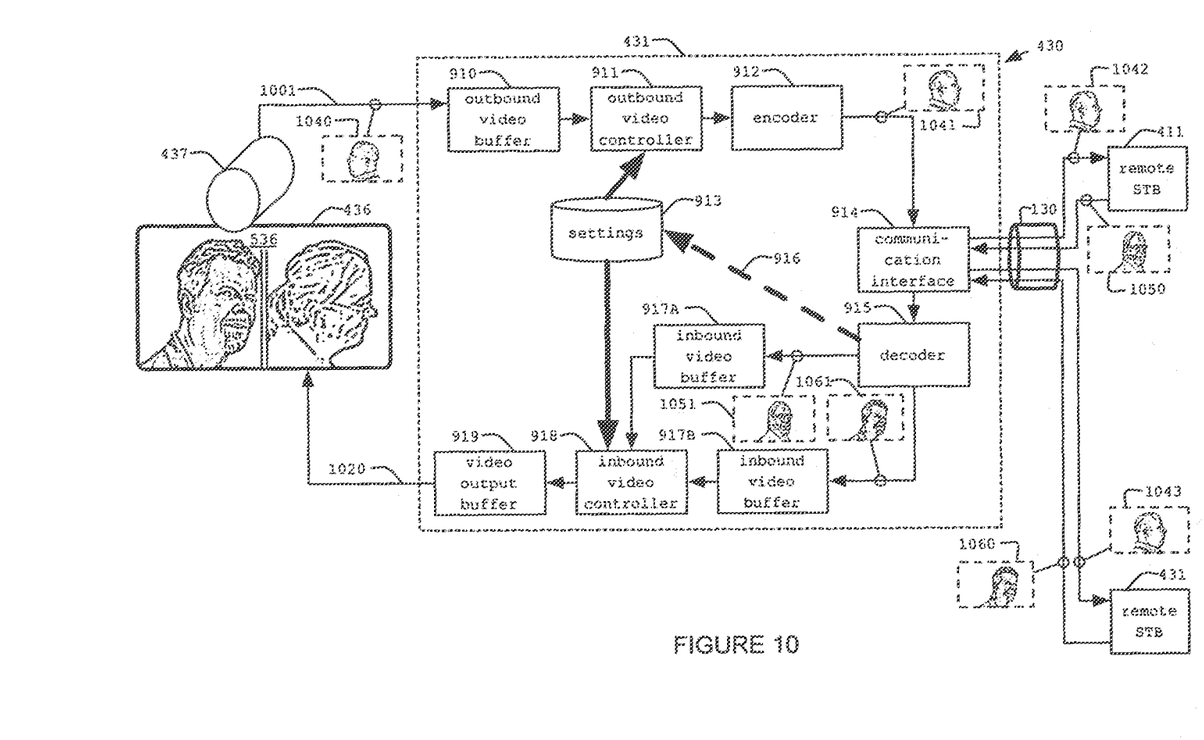

FIGS. 9 and 10 each depict block diagrams showing an exemplary embodiment of the telepresence portion of the STBs 411 and 431 as applied to the system 400 and its operation illustrated in FIGS. 4 and 5. In FIG. 9, the telepresence camera 417 provides a video output signal 901 which carries a video image 940. The STB 411 receives the video output signal 901, within which the video image 940 gets acquired by an outbound video buffer 910 (the term "outbound" in this context refers to video destined for a remote sites).

The outbound video controller 911 accesses the video data from the video buffer 910 in accordance with the configuration data from the settings portion in a database 913. In this example, the telepresence monitor-camera pair 416-417 lies to the right side of the local participant 413 shown in FIG. 4, which corresponds to the configuration in the settings portion in the database 913. For the example depicted in FIGS. 9 and 10, the circumstances are that video being sent should have a conventional facing to the right. Thus, the outbound video controller 911 will pass the video out to the encoder 912 without a horizontal flip, since at step 805B, the local facing equals the conventional facing. Accordingly, the encoded video image 941 passes passed from the encoder 912 to the communication interface 914 for transmission on the communication channel 130 to each of remote STBs 421 and 431 as telepresence image streams 942 and 943, respectively.

Each of remote STBs 421 and 431 send corresponding telepresence image streams 950 and 960, respectively, via communication channel 130, for receipt by the STB 411 at its communication interface 914. For this example, each of image streams 950 and 960 also has the conventional facing to the right. These inbound telepresence streams pass from the communication interface 914 to a decoder 915. The decoder 915 distinguishes between each of inbound streams 950 and 960 and processes these as telepresence image data 951 and 961, respectively, written into the inbound video buffers 917A and 917B, respectively. Any remote site configuration metadata 916 recognized by decoder 915 undergoes storage in the settings portion 913 for use in the operation of the video controllers 911 and 918. Inbound video controller 918 accesses at least a portion of video data from video buffers 917A and 917B for writing to the video output buffer 919.

The inbound video controller 918 performs the access of video buffers 917A, 917B and writes to video output buffer 919 in accordance with configuration data from the settings portion 913, including which, if any, of the inbound images needs horizontal flipping. In this example, both inbound image streams are flipped horizontally (since at step 705B, the local facing equals the conventional facing). The STB 411 outputs the video signal 920 from video output buffer 919, for display on the telepresence screen as image 516.

Based on the information in the settings portion 913 within the STB 411, the image 940 captured by telepresence camera 417 requires no horizontal flip before being sent to remote the STBs 421 and 431. However, both of inbound video streams 950 and 960 must under horizontal flipping, and in this example, the horizontal flip occurs during the transfer of the video data from the inbound video buffers 917A and 917B to the video output buffer 919 by the inbound video controller 918. This results in the situation 510 for the site 410 depicted in FIG. 5 which shows that the faces of remote participants 423 and 433 in image 516 on telepresence screen 416 looking towards the shared screen 412.

Likewise, FIG. 10 shows the operation of the STB 431 at the site 430, yielding the situation 530. In the situation 530, the telepresence camera 437 provides the video output signal 1001 which carries a video image 1040. The STB 431 receives the video output signal 1001, resulting in the acquisition of the video image 1040 by the outbound video buffer 1010.

The outbound video controller 1011 accesses the data from video buffer 1010 in accordance with configuration data from the settings portion 1013. In this example, the telepresence monitor/camera pair 436/437 resides to the left of the local participant 433 as shown in FIG. 4, which is not appropriate given the configuration listed in the settings portion 1013, as would be detected at step 805B resulting in the processing of step 806. Thus, the outbound video controller 1011 will passes the video out to an encoder 1012 with a horizontal flip. The encoded video image 1041 passes from encoder 1012 to communication interface 1014 for transmission on the communication channel 130 to each of remote STBs 411 and 431 as the telepresence image streams 950 and 1043, respectively.

Each of the remote STBs 411 and 421 sends corresponding telepresence image streams 1060 and 942, respectively, via the communication channel 130, for receipt by the STB 431 though its communication interface 1014. These inbound telepresence streams pass from communication interface 1014 to a decoder 1015. The decoder 1015 distinguishes between each of the inbound streams 942 and 1060 and processes these streams as telepresence image data 1051 and 1061, respectively, written to the inbound video buffers 1017A and 1017B, all respectively. Any remote site configuration metadata 1016 recognized by decoder 1015 undergoes storage in the settings portion 1013 for use in the operation of the video controllers 1011, 1018. The inbound video controller 1018 will access at least a portion of video data from the video buffers 1017A and 1017B for writing to the video output buffer 919. The inbound video controller 1018 performs the access of video buffers 1017A, 1017B and the writing to video output buffer 1019 in accordance with configuration data from the settings portion 1013, including which, if any of the inbound images need horizontal flipping (which in this example is neither). The STB 431 will output a video signal 1020 from video output buffer 1019 for display on the telepresence screen as the image 536.

In accordance with the information in the settings portion 1013 within the STB 431, the image 1040 captured by telepresence camera 437 requires a horizontal flip before being sent to remote STBs 411, 431. However, both of inbound video streams 942 and 1060 possess the correct orientation and require no horizontal flipping. The result, as shown for the site 430 in situation 530 in FIG. 5, indicates that the faces of the remote participants 413 and 433 in the image 536 on telepresence screen 436 seem to look toward the shared screen 432.

The foregoing describes a technique for sharing content among a distributed audience to enable display of the image of a local participant with a common orientation recognized by at least one remote participant.

The invention claimed is:

1. A method for sharing images of participants in a group, comprising the steps of:
    establishing, for a local participant seeking to share its image, orientation information indicative of an orientation of the local participant relative to a video display device screen and a video capture device;
    sending the image of the local participant along with the orientation information to at least one remote participant so that image of the local participant will have a common orientation recognized by the at least one remote participant.

2. The method according to claim 1 wherein the establishing step comprises the step of accessing stored orientation information in a database.

3. The method according to claim 1 wherein the establishing step comprises the step of prompting the local participant to manually enter the orientation information.

4. The method according to claim 3 wherein the prompting step includes the step of visually displaying instructions to the local participant.

5. The method according to claim 3 further including the step of storing the user-entered orientation information in a database.

6. The method according to claim 1 wherein the sending step further includes the steps of:
    exchanging orientation information of the local participant and the at least one remote participant;
    comparing the orientation information of the local participant with the orientation information of the at least one remote participant; to determine whether the local participant and the at least one participant have common facing, and if so;
    altering the orientation of the image of the local participant prior to sending the image to the at least one remote participant.

7. The method according to claim 1 wherein the sending step further includes the steps of:
    exchanging orientation information of the local participant and the at least one remote participant;
    comparing the orientation information of the local participant with the orientation information of the at least one remote participant; to determine whether the local participant and the at least one participant have common facing, and if not;
    sending the image of the local to the at least one remote participant without image alteration.

8. The method according to claim 1 wherein the sending step further includes the steps of:
    exchanging orientation information of the local participant and the at least one remote participant;
    comparing the orientation information of the local participant with the orientation information of the at least one remote participant; to determine whether the local participant and the at least one participant have common facing, and if so;
    sending the image of the local to the at least one remote participant without image alteration when the local participant has a given facing.

9. The method according to claim 1 wherein the sending step further includes the steps of:
    exchanging orientation information of the local participant and the at least one remote participant;
    comparing the orientation information of the local participant with the orientation information of the at least one remote participant; to determine whether the local participant and the at least one participant have common facing, and if not;
    altering the orientation of the image of the local prior to sending to the at least one remote participant when the local participant has a given facing.

10. A telepresence system sharing an image of a local participant with at least one remote participant, comprising:
    a video capture device for capturing the image of the local participant;
    a video display device for displaying the image of the at least one remote participant; and
    a communications device coupled to the video display device and the video capture device for establishing orientation information indicative of an orientation of the local participant relative to the video display device and the video capture device and for sending the image of the local participant along with the orientation information to at least one remote participant so that image of the local participant will have a common orientation recognized by the at least one remote participant.

11. The apparatus according to claim 10 wherein the communications device comprises a set-top-box.

12. The apparatus according to claim 11 wherein the communications device establishing the orientation information by accessing orientation information stored in a database.

13. The apparatus according to claim 11 the communications device establishes the orientation information by prompting the local participant to manually enter the orientation information.

14. The apparatus according to claim 11 wherein the communications device prompts the local user to manually enter the orientation information by sending instructions for visual display on the visual display device.

15. The apparatus according to claim 11 further including a database for storing user-entered orientation information.

16. The apparatus according to claim 11 wherein the communications sends the orientation information by (a) exchanging orientation information of the local participant and the at least one remote participant; (c) comparing the orientation information of the local participant with the orientation information of the at least one remote participant; to determine whether the local participant and the at least one participant have common facing, and if so; (d) altering the orientation of the image of the local participant prior to sending the image to the at least one remote participant.

17. The apparatus according to claim 11 wherein the communications sends the orientation information by (a) exchanging orientation information of the local participant and the at least one remote participant; (b) comparing the orientation information of the local participant with the orientation information of the at least one remote participant; to determine whether the local participant and the at least one participant have common facing, and if not; (c) sending the image of the local to the at least one remote participant without image alteration.

18. The apparatus according to claim 11 wherein the communications sends the orientation information by (a)

exchanging orientation information of the local participant and the at least one remote participant; (b) comparing the orientation information of the local participant with the orientation information of the at least one remote participant; to determine whether the local participant and the at least one participant have common facing, and if so; (c) sending the image of the local to the at least one remote participant without image alteration when the local participant has a given facing.

19. The apparatus according to claim 11 wherein the communications sends the orientation information by (a) exchanging orientation information of the local participant and the at least one remote participant; (b) comparing the orientation information of the local participant with the orientation information of the at least one remote participant; to determine whether the local participant and the at least one participant have common facing, and if not; (c) altering the orientation of the image of the local prior to sending to the at least one remote participant when the local participant has a given facing.

* * * * *